(No Model.)
G. W. HOWELL.
WHEEL.
No. 360,156. Patented Mar. 29, 1887.
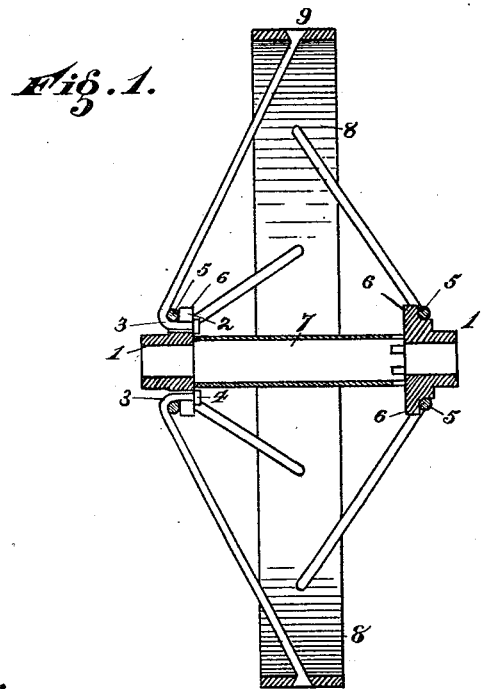
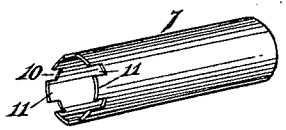
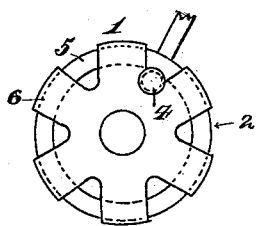
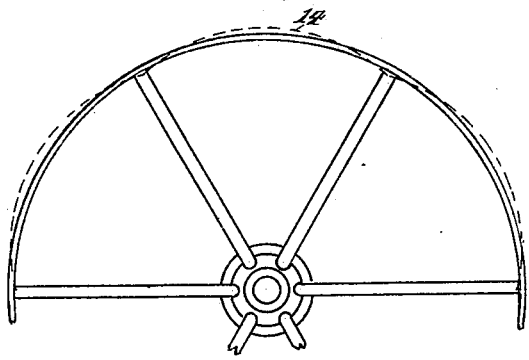
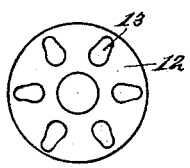
Attest
J. Watson Sims
Jno. S. Roebuck Jr.
Inventor
George W. Howell
By Woon & Boys
his Attorneys &c

UNITED STATES PATENT OFFICE.

GEORGE W. HOWELL, OF COVINGTON, KENTUCKY.

WHEEL.

SPECIFICATION forming part of Letters Patent No. 360,156, dated March 29, 1887.

Application filed June 30, 1886. Serial No. 206,723. (No model.)

*To all whom it may concern:*

Be it known that I, GEORGE W. HOWELL, a resident of Covington, in the county of Kenton and State of Kentucky, have invented a certain new and useful Improvement in Wheels, of which the following is a specification.

My invention relates to an improvement in wheels.

The object of my invention is to produce a cheap and durable metallic wheel, all of which will be fully explained in the description of the accompanying drawings, making a part of this specification, in which—

Figure 1 is a vertical central section of my improved wheel. Fig. 2 is a detail view of one form of sleeve. Fig. 3 is a diagram illustrating the method of straining the wheel. Fig. 4 is a modification of the hub shown in Fig. 1. Fig. 5 is a plan view of the hub shown in Fig. 1.

1 is a metallic hub constructed with notches 2, in which the neck 3 of the spokes rests.

4 represents the head of the spoke formed on the neck 3, so as to prevent it from being pulled out of the notches.

5 represents a ring inserted between the collar 6 and the neck of the spokes 3.

7 represents a sleeve or axle used in straining the wheel.

8 represents the rim pierced with flared holes, in which the head 9 of the spokes rests. These spokes are inserted through this hole, with the necks engaging in the notches 2 of the hub 1. The ring 5 is strung on over the heads 4 of the spokes before the necks are inserted in the notches 2 of the hub. They are then placed within said notches, and the hubs 1 are sprung apart and the sleeve 7 inserted to hold it in a sprung position.

By making the rim 8 flexible it may be sprung by straining the spokes apart, so as to spread the hubs a distance apart sufficient to insert the sleeve 7. The ends of the sleeve 7 bear against the inner edges of the hubs 1, and are supported and kept in position by the spoke-heads 4.

Any straining-power device may be employed to spread the hubs 1 apart sufficient to allow the insertion of the sleeve. When the straining power is released, the recoil of the rim or of the spokes which have been sprung by the straining devices clamp the ends of the sleeve 7 between the hubs 1 and securely hold it in position. When the heads 4 of the spokes are large, or the rim stiff, I provide notches 10 in the end of the sleeve 7 at the proper points, to allow the said notches to pass over the spoke-heads 4. When the ring is turned so as to bring the spaces 11 between the notches opposite the heads of the spoke which holds it in position, the wheel is retained by the recoil of the metal in position. In this form I do not wish to limit myself to the hub composed of the parts 1 and the ring 5, as, instead of the notched hub 1 and ring 5, the disk 12, with slots 13, may be used, through which the spokes are inserted, and it will be the equivalent of the hub 1 and ring 5. When the strain which spreads the hub apart is imparted to the rim 8, it assume the position shown in dotted lines 14, Fig. 3. As soon as the strain is released, the flexibility of the metal brings it back into the circular shape. When flexible spokes or a flexible rim is employed for the wheel, the notches 10 may be omitted, as the flexible metal will allow the hubs to be spread apart sufficient to receive the sleeve without employing said notches; but when the rim and spokes are quite rigid the notches 10 lessen the amount of strain necessary to be employed to strain the hubs and allow the insertion of the sleeve to be more easily made.

I claim—

In combination with the rim 14 of the hub 1, having the attached radially-projecting collar 6, provided with a series of recesses, 2, the spokes having necks 3 extending through said recesses, and provided with heads 4, engaged with the rear side of said collar, and the ring 5, located between the spokes and the collar and bearing against the latter, and the straining tube or sleeve 7, for receiving the wheel-axle, interposed between two of said hubs, substantially as and for the purpose described.

In testimony whereof I have hereunto set my hand.

GEORGE W. HOWELL.

Witnesses:
ROBERT ZAHNER,
M. E. MILLIKAN.